(12) United States Patent
Batruni

(10) Patent No.: US 7,689,297 B2
(45) Date of Patent: *Mar. 30, 2010

(54) NONLINEAR SYSTEM OBSERVATION AND CONTROL

(75) Inventor: Roy G. Batruni, Danville, CA (US)

(73) Assignee: Optichron, Inc., Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/288,783

(22) Filed: Oct. 22, 2008

(65) Prior Publication Data

US 2009/0054999 A1     Feb. 26, 2009

Related U.S. Application Data

(63) Continuation of application No. 11/246,914, filed on Oct. 7, 2005, now Pat. No. 7,460,916.

(60) Provisional application No. 60/620,613, filed on Oct. 19, 2004.

(51) Int. Cl.
*G05B 13/02*     (2006.01)

(52) U.S. Cl. .................. 700/40; 700/28; 700/52; 703/2

(58) Field of Classification Search .............. 700/34, 700/28, 44, 47, 52, 40, 45, 55, 39, 46; 703/2
See application file for complete search history.

(56) References Cited

U.S. PATENT DOCUMENTS

| 5,311,435 | A  | * | 5/1994  | Yocum et al. ............... 701/226 |
| 5,483,439 | A  | * | 1/1996  | Ono et al. ..................... 700/29 |
| 6,285,971 | B1 | * | 9/2001  | Shah et al. ..................... 703/2 |
| 7,165,465 | B2 | * | 1/2007  | De Lair et al. ......... 73/862.326 |
| 7,460,916 | B2 | * | 12/2008 | Batruni ........................ 700/34 |

* cited by examiner

*Primary Examiner*—Ramesh B Patel
*Assistant Examiner*—Steven R Garland
(74) *Attorney, Agent, or Firm*—Van Pelt, Yi & James LLP

(57) ABSTRACT

An observation system configured to observe one or more initially unknown state variables of an observed system includes an input interface configured to receive a system input, and a processing module coupled to the input interface. The processing module is configured to determine the one or more initially unknown state variables, and the determination is based at least in part on the system input, a plurality of known state variables, and a time varying mode vector that is time dependent.

28 Claims, 16 Drawing Sheets

Receive a System Input — 352

Estimate Unknown State Variables Using the System Input, a Time Varying Mode Vector and known State Variables — 354

NONLINEAR SYSTEM OBSERVATION AND CONTROL

CROSS REFERENCE TO OTHER APPLICATIONS

This application is a continuation of U.S. patent application Ser. No. 11/246,914 entitled NONLINEAR SYSTEM OBSERVATION AND CONTROL filed Oct. 7, 2005 now U.S. Pat. No. 7,460,916 which is incorporated herein by reference for all purposes, which claims priority to U.S. Provisional Application No. 60/620,613 entitled CONTROL AND OBSERVATION OF STATE VARIABLES IN NONLINEAR SYSTEMS filed Oct. 19, 2004 which is incorporated herein by reference for all purposes.

BACKGROUND OF THE INVENTION

A system's input-output relationship can be classified as either linear or nonlinear. The input-output relationships in systems can typically be represented mathematically using equations referred to as transfer functions. Linear systems such as linear filters used in signal processing applications have linear transfer functions, therefore are typically easier to model than nonlinear systems.

A linear filter with an infinite impulse response can be generally described using the following equation:

$$y_n = h_0 u_n + \ldots + h_{N-1} u_{n-N+1} - g_1 y_{n-1} - \ldots - g_{N-1} y_{n-N+1} \quad \text{(Equation 1)},$$

where $u_{n-j}$ is the filter input at time n–j, $y_{n-j}$ is the filter output at time n–j, $h_k$ and $g_k$ are filter coefficients. A linear filter with a finite impulse response can be generally described as $$y_n = h_0 u_n + \ldots + h_{N-1} u_{n-N+1} \quad \text{(Equation 2)}.$$

Linear filters have states, which can be fully described using linear equations. One example of a state-space description is the following:

$$X_{n+1} = AX_n + Bu_n \quad \text{(Equation 3)},$$

$$y_n = CX_n + Du_n \quad \text{(Equation 4)},$$

where $X_{n+1}$ is the next-state vector at time n+1, $X_n$ is the current state vector at time n, A is an N×N state-transition matrix, B is an N×1 vector that maps the input variable to the next-state, C is a 1×N vector that maps the current state to the output, D is a scalar that maps the input to the output.

The state-space description can be used to observe state variables that characterize the system. State variables are useful for controlling system properties such as noise and stability, and for providing better observability of system parameters. State variable description of linear systems is well developed and various implementations of the state-space models of linear systems exist. In contrast, state variables in nonlinear systems such as communication and control systems are often not directly accessible to the user. Furthermore, because of their deviation from the standard linear filters and linear systems, nonlinear systems typically do not offer an easy way to derive their state-space representations. As a result, it is often difficult to control nonlinear systems using state variables. Some of the existing techniques use averages to approximate the nonlinear relationships in order to derive state-space representations. However, the approximations are often inaccurate and complex to implement.

It would be desirable to have a better way to model the state variables in nonlinear systems, so that the systems' dynamics and stability could be better controlled. It would also be useful if the state variables of inverse nonlinear systems could be determined as well.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Nonlinear system observation and control are disclosed. In some embodiments, one or more system inputs associated with the observed system are received. The system input(s), one or more known state variables associated with the observed system, and a time varying mode vector associated with the observed system are processed. One or more unknown state variables are generated using the known state variable(s), the system input(s), and the time varying mode vector. In some embodiments, a plurality of filters is configured to receive the known state variables, the time varying mode vector, and the system input, and to generate one or more unknown state variables using the filter inputs.

Figure 1:
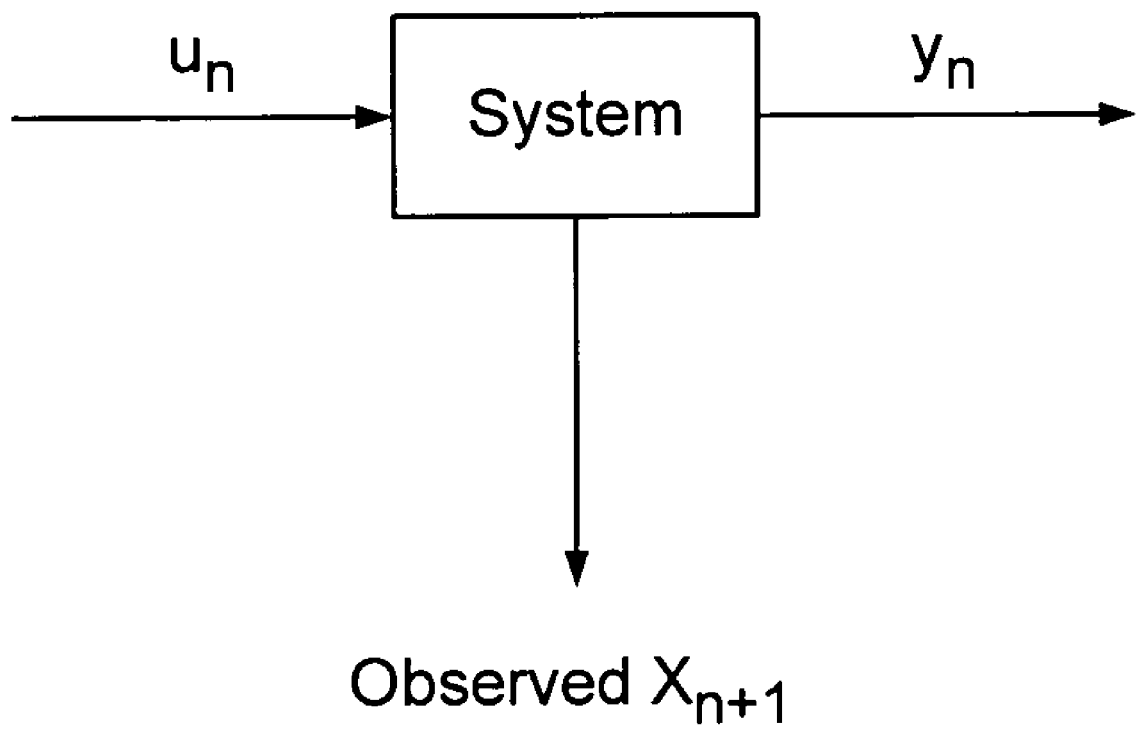
FIG. 1 is a diagram illustrating an example system under observation.

FIG. 1 is a diagram illustrating an example system under observation. As used herein, observation refers to predicting system parameters such as states or outputs based on a known model of the system. In the following specification, the input variable of the system is denoted as $u_n$, the output variable of the system is denoted as $y_n$, and the system state variable is denoted as $x_n$. The system's state vector $X_n$ includes a plurality of state variables. The transfer function of the system can be either linear or nonlinear. It is represented as:

$$y_n = h(u_n) \quad \text{(Equation 5)}.$$

There are many applications for the observation of system states and/or outputs. In some applications, the observation provides information about the system such as stability and dynamic characteristics. In some applications, a comparison of the observed output and the actual output is used to identify any inaccuracy in the system model and make improvements. In some applications, the states are used to control the system when the inputs are not easily accessible. Observation establishes the dominant state(s) in which a relatively small disturbance causes a relatively large change in the output. The dominant state(s) may be used to quickly adjust the system output to the desired range and the non-dominant state(s) may be used to fine tune the output.

Linear System Analysis

To better understand the observation of state variables in nonlinear systems, a linear system is first analyzed. Certain transformation of linear relationships is also applicable in nonlinear systems. A linear systems with a transfer function similar to Equation 1 has an ABCD matrix representation as follows:

$$A = \begin{bmatrix} -g_1 & -g_2 & \cdots & -g_{N-1} \\ 1 & 0 & \cdots & 0 \\ 0 & 1 & \cdots & 0 \\ 0 & 0 & 1 & 0 \end{bmatrix} \quad \text{(Equation 6)}$$

$$B = \begin{bmatrix} 1 \\ 0 \\ \vdots \\ 0 \end{bmatrix} \quad \text{(Equation 7)}$$

$$C = [c_1 \ c_2 \ \ldots \ c_{N-1}] = [h_1 - g_1 \ h_2 - g_2 \ \ldots \ h_{N-1} - g_{N-1}] \quad \text{(Equation 8)}$$

$$D = 1 \quad \text{(Equation 9)}$$

The A matrix form shown above is one of several possible forms. For purposes of illustration, an A matrix having the form shown in Equation 3 is used throughout this specification, although other forms of the A matrix may also be used. Based on Equation 3, $X_{n+1}$ can be expressed as:

$$X_{n+1} = \begin{bmatrix} -g_1 & -g_2 & \cdots & -g_{N-1} \\ 1 & 0 & \cdots & 0 \\ 0 & 1 & \cdots & 0 \\ 0 & 0 & 1 & 0 \end{bmatrix} X_n + \begin{bmatrix} 1 \\ 0 \\ \vdots \\ 0 \end{bmatrix} u_n \quad \text{(Equation 10)}$$

The generalized form of Equation 10 expresses the A matrix using the same parameters that appear in the output equations, i.e. the vector $$\hat{G} = [g_1 g_2 \ldots g_{N-1}] \quad \text{(Equation 11)},$$

and expresses the C vector as:

$$C = [c_1 c_2 \ldots c_{N-1}] = [h_1 - g_1 h_2 - g_2 \ldots h_{N-1} - g_{N-1}] = \hat{H} - \hat{G} \quad \text{(Equation 12)},$$

where $$H = [h_0 h_1 h_2 \ldots h_{N-1}] \quad \text{(Equation 13)},$$

$$\hat{H} = [h_1 h_2 \ldots h_{N-1}] \quad \text{(Equation 14)},$$

$$G = [1 g_1 g_2 \ldots g_{N-1}] \quad \text{(Equation 15)}.$$

The roots of the polynomial $$1 + g_1 z + g_2 z^2 + \ldots + g_{N-1} z^{N-1} \quad \text{(Equation 16)}$$

form the poles of the filter, and the roots of the polynomial $$h_0 + h_1 z + h_2 z^2 + \ldots + h_{N-1} z^{N-1} \quad \text{(Equation 17)}$$

form the zeros of the filter. The poles of a system or a filter are also referred to as modes. Throughout this specification, vector $\hat{G}$ is referred to as the mode vector of the filter or system.

State-transition Equation 10 shown above can be expressed in an equivalent form that will be used later to describe the nonlinear state-transition equations and nonlinear filter. The transformation is shown as:

$$X_{n+1} = \begin{bmatrix} -g_1 & -g_2 & \cdots & -g_{N-1} \\ 1 & 0 & \cdots & 0 \\ 0 & 1 & \cdots & 0 \\ 0 & 0 & 1 & 0 \end{bmatrix} X_n + \begin{bmatrix} 1 \\ 0 \\ \vdots \\ 0 \end{bmatrix} u_n \quad \text{(Equation 18)}$$

$$= \begin{bmatrix} x_n & x_{n-1} & \cdots & x_{n-N+1} \\ x_{n-1} & x_{n-2} & \cdots & x_{n-N} \\ \vdots & \vdots & \cdots & \vdots \\ x_{n-N+1} & x_{n-N} & \cdots & x_{n-2N+1} \end{bmatrix} \hat{G}^T + \begin{bmatrix} u_n \\ u_{n-1} \\ \vdots \\ u_{n-N+1} \end{bmatrix}$$

$$= [X_n \ \ldots \ X_{n-N+1}] \hat{G}^T + U_n$$

$$= \overline{X}_n \hat{G}^T + U_n$$

where $\overline{X}_n = [X_n \ \ldots \ X_{n-N+1}]$.

In this form, the state-transition equation expresses each variable in the next-state vector as a function of an inner vector product of the past history of that particular state and the mode vector $\hat{G}$, plus the input at the time instant related to that particular next state variable. This expression, although not commonly used in linear systems or linear filtering, will prove to be useful in nonlinear filter state-space equations. This form shows that each of the state-variables has the same mode $\hat{G}^T$ (sometimes referred to as a "memory function") that varies with time.

Nonlinear System Analysis

A nonlinear system such as a nonlinear filter can be modeled as a continuum of linear filters as the following:

$$y_n = \tilde{h}_{0,n-1} u_n + \ldots + \tilde{h}_{N-1,n-1} u_{n-N+1} - \tilde{g}_{1,n-1} y_{n-1} - \ldots - \tilde{g}_{N-1,n-1} y_{n-N+1} \quad \text{(Equation 19)},$$

where at each time instant n the filter appears to be a linear combination of coefficients $\tilde{h}_{j,n-1}$ and $\tilde{g}_{j,n-1}$, and where all or some of the coefficients $\tilde{h}_{j,n-1}$ and $\tilde{g}_{j,n-1}$ are functions of signals $u_{n-k}$, $y_{n-k}$ or both. Thus, the output is a nonlinear function of the input with time varying coefficients. As will be shown in more details below, this nonlinear filter can be implemented using a nonlinear state-space form.

Figure 2A:
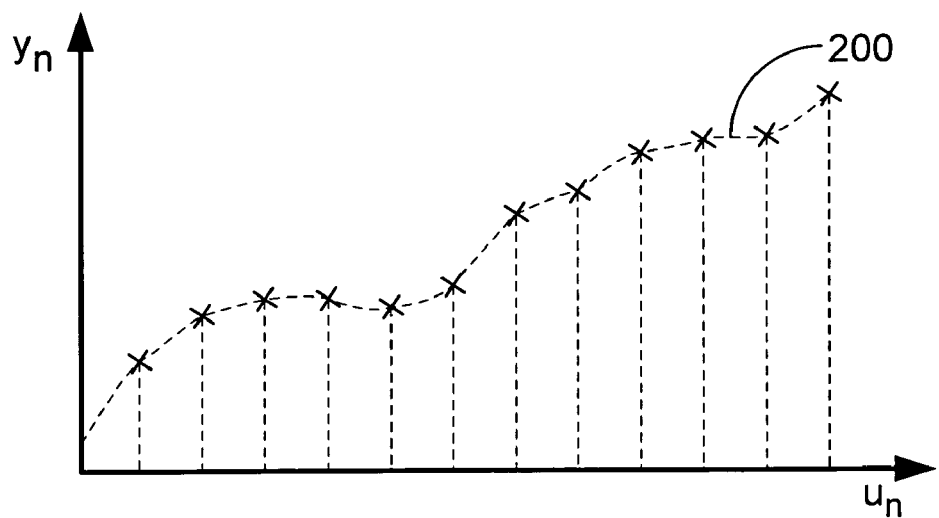
FIGS. 2A-2B are diagrams illustrating the modeling of a nonlinear function using a plurality of linear functions.
Figure 2B:
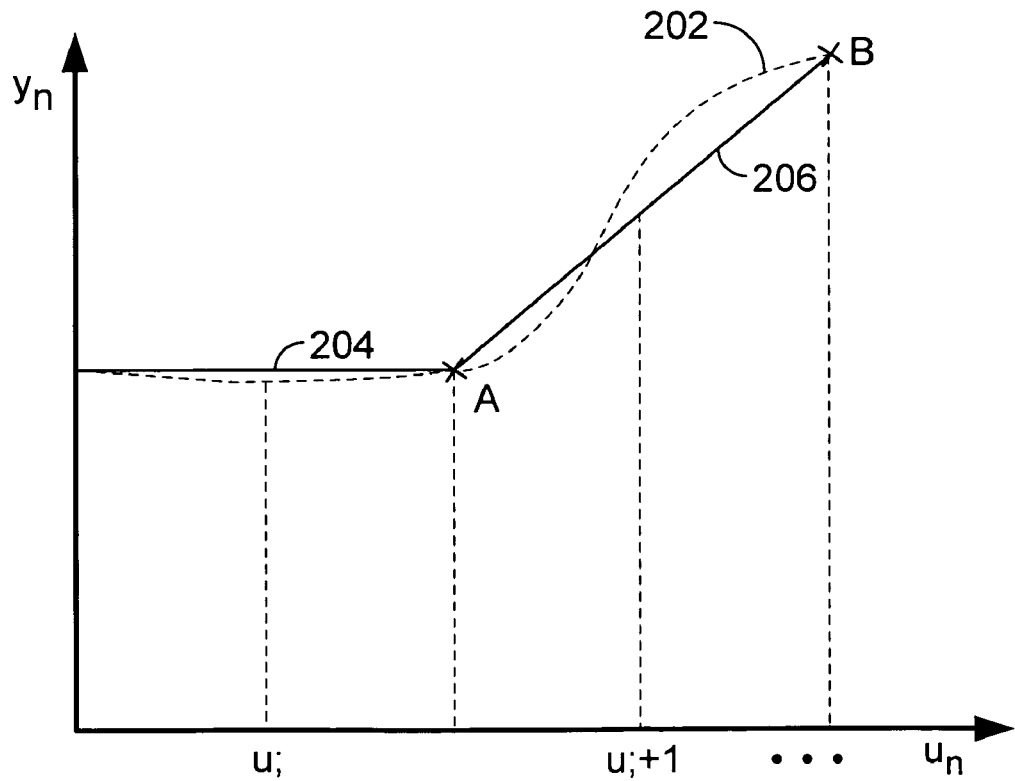

FIGS. 2A-2B are diagrams illustrating the modeling of a nonlinear function using a plurality of linear functions. In FIG. 2A, samples of a nonlinear function 200 are taken at different times. The nonlinear function is approximated using a plurality of linear functions. Techniques such as least mean squared fit can be used to derive the linear functions. A zoomed view of a region of function 200 is shown in FIG. 2B. At times $u_i$ and $u_{i+1}$, the original function is approximated using two different linear functions shown as segments 204 and 202, respectively. Accordingly, for other times that correspond to different regions of the function, there are values of the mode vector that corresponds to the respective linear functions.

To estimate the nonlinear state-space, a structure similar to the equivalent linear state-space transition equation is used. Let the state vector at time n be $$X_n = \begin{bmatrix} x_n^0 \\ x_n^1 \\ \vdots \\ x_n^{N-1} \end{bmatrix}. \quad \text{(Equation 20)}$$

The state-transition equation can be expressed as:

$$X_{n+1} = \begin{bmatrix} x_n^0 & x_{n-1}^0 & \ldots & x_{n-N+1}^0 \\ x_n^1 & x_{n-1}^1 & \ldots & x_{n-N+1}^1 \\ \vdots & \vdots & \ldots & \vdots \\ x_n^{N-1} & x_{n-1}^{N-1} & \ldots & x_{n-N+1}^{N-1} \end{bmatrix} \left(-\tilde{G}_n^T\right) + \begin{bmatrix} u_n \\ u_{n-1} \\ \vdots \\ u_{n-N+1} \end{bmatrix}, \quad \text{(Equation 21)}$$

$$= [X_n \ldots X_{n-N+1}](-\tilde{G}_n^T) + U_n$$

$$= \overline{X}_n(-\tilde{G}_n^T) + U_n$$

where $$\tilde{G}_n = [\tilde{g}_{1,n} \tilde{g}_{2,n} \ldots \tilde{g}_{N-1,n}], \quad \text{(Equation 22)}$$

in which each mode $\tilde{g}_{j,n}$ is a function of input $u_{n-k}$, output $y_{n-k}$ and/or state $x_{n-k}^j$. Written in this form, the state-transition equation for each state at time n+1 is a filtered function of its own history. In some embodiments, the function is linear. Each state uses a mode vector $\tilde{G}_n = [\tilde{g}_{1,n} \tilde{g}_{2,n} \ldots \tilde{g}_{N-1,n}]$, also referred to as the composite mode of the system, as the filtering function. Depending on the system involved, the mode function may be a function of factors such as time, changes in external parameters, the past and present state vector, the past and present inputs/outputs, etc. Since the mode vector function changes as the past values of its variables change, the mode vector is referred to as the time varying mode vector. As shown in FIG. 2B, the derivation of the system mode for each time step is carried out by evaluating the linear approximation of the system's transfer function in the span of the time step. Thus, for each time step, there is a corresponding system mode.

The output part of the state-space equation can now be written as $$y_n = CX_n + Du_n \quad \text{(Equation 23)}.$$

For purposes of example, let D=1. Substitution based on Equation 21 results in an output equation $$y_n = u_n + (C + \tilde{G}_{n-1})\hat{U}_{n-1} + \tilde{G}_{n-1}\hat{Y}_{n-1} = \quad \text{(Equation 24)}$$
$$u_n + \tilde{H}_{n-1}\hat{U}_{n-1} - \tilde{G}_{n-1}\hat{Y}_{n-1}$$

where $$\tilde{H}_n = C + \tilde{G}_n = [c + \tilde{g}_{1,n} \, c_2 + \tilde{g}_{2,n} \ldots c_{N-1} + \tilde{g}_{N-1,n}] = \quad \text{(Equation 25)}$$
$$[\tilde{h}_{1,n} \tilde{h}_{2,n} \ldots \tilde{h}_{N-1,n}],$$

$$\hat{U}_{n-1} = \begin{bmatrix} u_{n-1} \\ u_{n-2} \\ \vdots \\ u_{n-N+1} \end{bmatrix}, \quad \text{(Equation 26)}$$

$$\hat{Y}_{n-1} = \begin{bmatrix} y_{n-1} \\ y_{n-2} \\ \vdots \\ y_{n-N+1} \end{bmatrix}, \quad \text{(Equation 27)}$$

which gives $$y_n = u_n + \tilde{h}_{1,n-1} u_{n-1} \ldots + \tilde{h}_{N-1,n-1} u_{n-N+1} - \quad \text{(Equation 28)}$$
$$\tilde{g}_{1,n-1} y_{n-1} - \ldots - \tilde{g}_{N-1,n-1} y_{n-1N+1}.$$

Figure 3A:
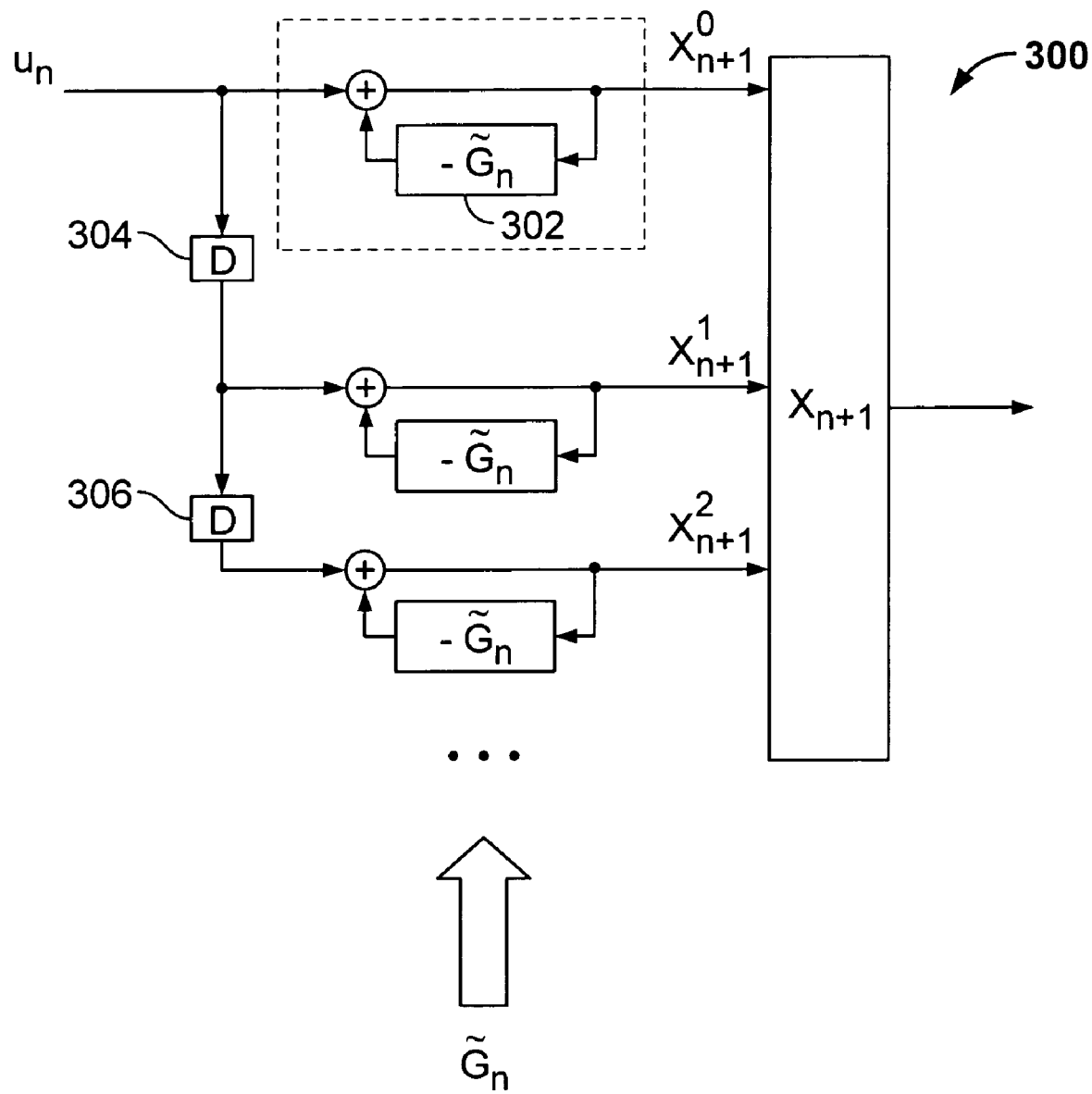
FIG. 3A is a block diagram illustrating an embodiment of a state variable observation system.

FIG. 3A is a block diagram illustrating an embodiment of a state variable observation system. In this example, state observation module 300 implements equation 21. The state observation module includes a plurality of filters that form a filter bank. The filters in the filter bank, such as filter 302, have characteristics (i.e., filter system response) that depend on the mode of the observed system. At any given time n, the corresponding mode vector $\tilde{G}_n$ is determined, sent to the filter bank and used to configure the filters in the filter bank. In the example shown, each filter is configured to have a transfer function equal to $-\tilde{G}_n$. Since $\tilde{G}_n$ is time dependent and may vary over time, the filters' characteristics are also time dependent and possibly varying over time. As will be shown in more details below, the system's states can be estimated if the time varying mode vector is known.

At time n, input variable $u_n$ is sent to delay stages such as 304 and 306 to generate inputs $u_{n-1}$, at time n-1 and $u_{n-2}$ at time n-2. The number of delay stages used depends on implementation and may vary for different embodiments. State variables at time n include $x_n^0$, $x_n^1$, $x_n^2$, etc. The state variables are processed by filters having a transfer function of $-\tilde{G}_n$, and summed with the inputs to generate the state vector $X_{n+1}$ at a future time n+1. The state vector entries includes state variables $x_{n+1}^0$, $x_{n+1}^1$, $x_{n+1}^1$, etc.

Figure 3B:
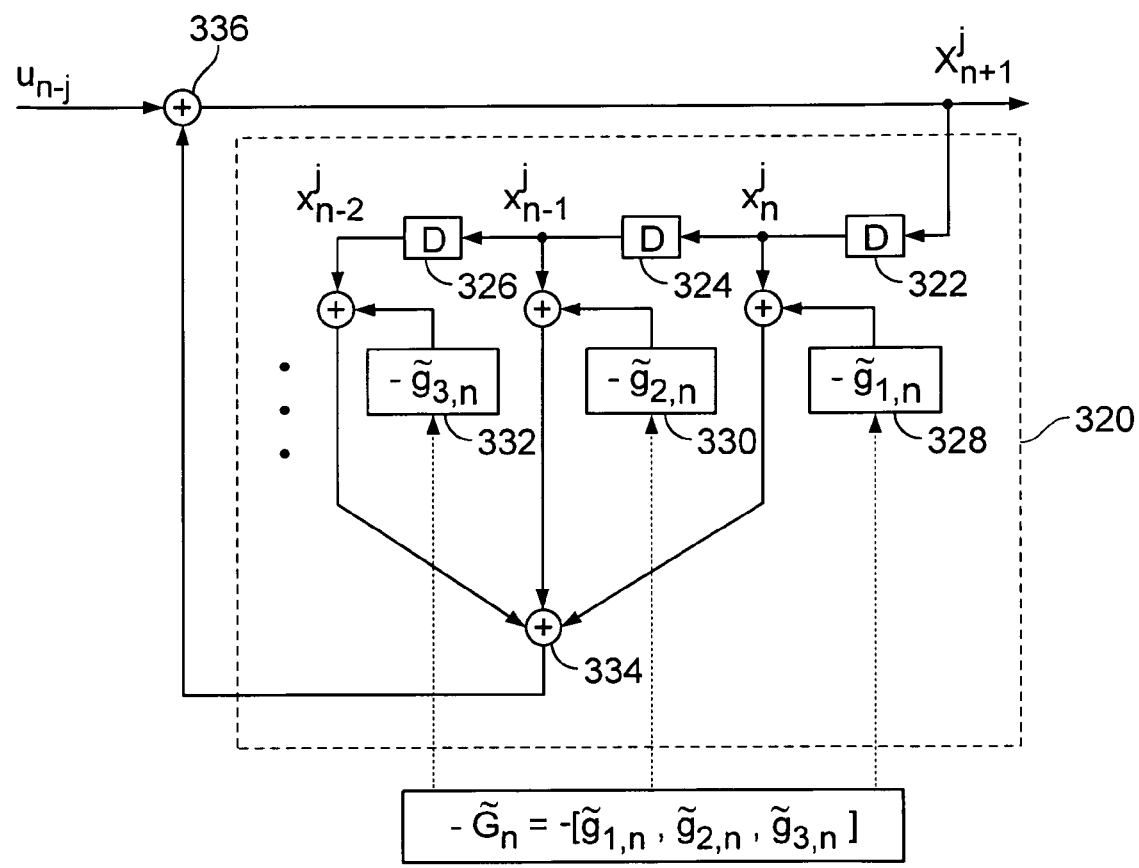
FIG. 3B is a block diagram illustrating a state transition unit embodiment used to generate a state variable.

FIG. 3B is a block diagram illustrating a state transition unit embodiment used to generate a state variable. In this example, the state variable to be computed is $x_{n+1}^j$, a j-th state variable at time n+1. Filter 320, which corresponds to a filter such as 302 shown in FIG. 3A, includes delay stages 322, 324 and 326, and registers 328, 330 and 332. The numbers of delay stages and registers depend on implementation and may vary for other embodiments. Also included in the filter are a plurality of multipliers and a combiner 334. The state variable is sent to the delay stages to obtain state variables at previous times (i.e. $x_n^j, x_{n-1}^j, x_{n-2}^j$, etc.). The variables for mode vector $\tilde{G}_n$ is computed, negated, and sent to registers to be used as filter coefficients. Each of the delayed state variables is multiplied with the filter coefficient. The results are added by combiner 334 and then sent to another combiner 336, to be added to an input delayed by j time periods, $u_{n-j}$. $x_{n+1}^j$ is generated as the filter output.

Figure 3C:
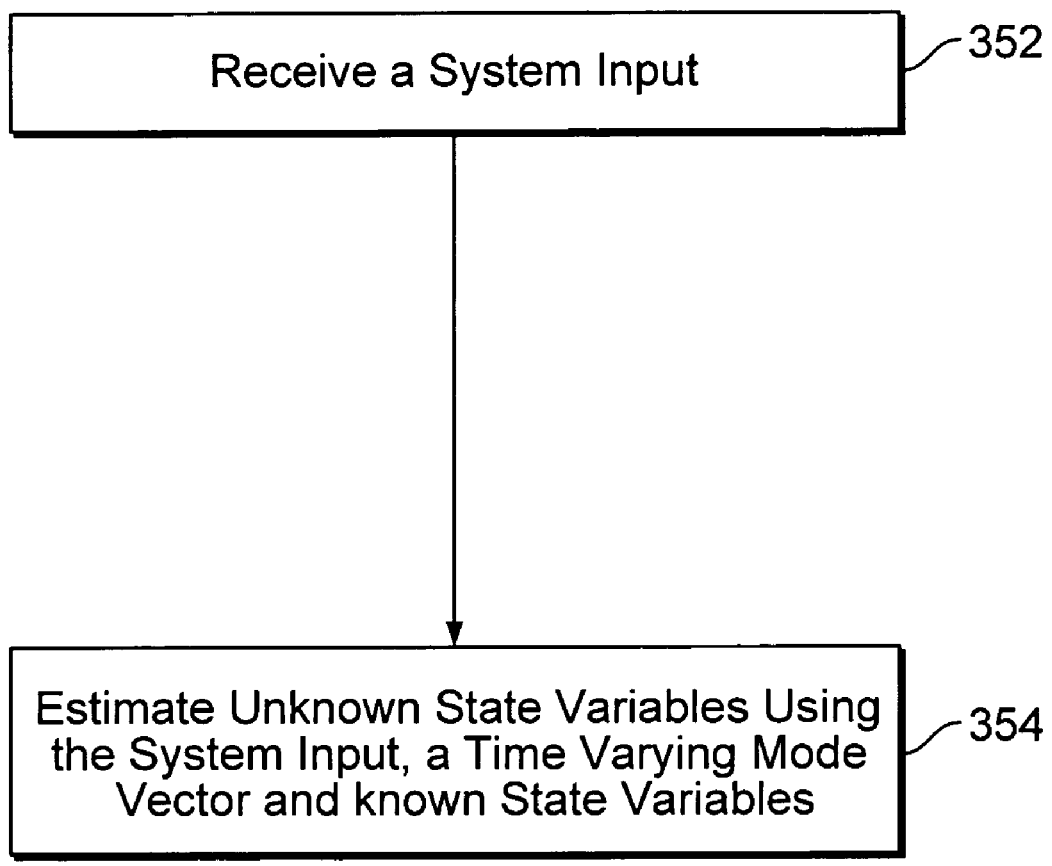
FIG. 3C is a flowchart illustrating a process of estimating unknown state variables according to some embodiments.

FIG. 3C is a flowchart illustrating a process of estimating unknown state variables according to some embodiments. The process shown in this example is performed by systems such as state observation module 300 of FIG. 3A. In some embodiments, the process is implemented in software and/or code, such as the code used in digital signal processors or other general purpose computer processor. In this example, the process begins when a system input is received (352). The system input, the time varying mode vector associated with the system input and one or more known state variables (such as state variables of the system's initial state and state variables based on past estimations) are processed to estimate one or more unknown state variables (354). In some embodiments, a filter bank is used to processes the input, the time varying mode vector and the state variable(s) to make the estimation. As shown in FIGS. 3A-3B, the mode vector provides coefficients of the feedback filters used to process the known states. The unknown state variables are estimated by combining the system inputs and the filter outputs. Other estimation methods are sometimes used in different embodiments. The process may be repeated to generate other state variables. In some embodiments, the estimation function of the filter bank is implemented in software and/or firmware. Details of the function of the filter bank are described below.

Figure 4:
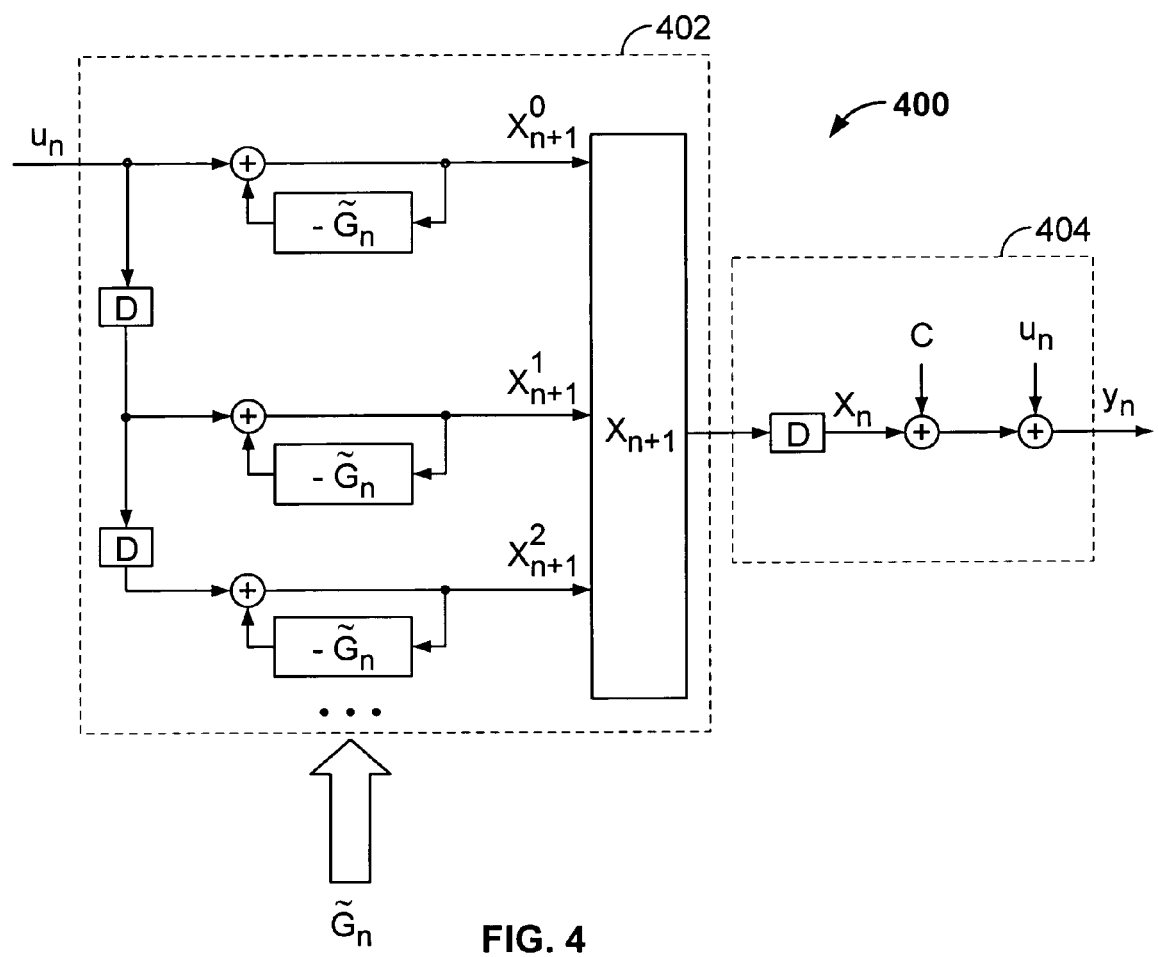
FIG. 4 is a block diagram illustrating a state space filter embodiment for observing the state variables and estimating the system outputs.

It is often useful to estimate the system output since sometimes the actual system output may be inaccessible or noisy, therefore not easily observed. FIG. 4 is a block diagram illustrating a state space filter embodiment for observing the state variables and estimating the system outputs. In this example, state space filter 400 implements equation 23 and equivalently equation 28. Filter 400 includes a state observation module 402 and an output computation module 404. State observation module 402 has similar functionality and structure as state observation module 300. At time n, the state observation module sends $X_{n+1}$ (the state vector for time n+1) to the output computation module. State vector $X_{n+1}$, is delayed to generate state vector $X_n$ at time n, which is multiplied with coefficient C and summed with the input $u_n$ to generate output $y_n$.

Figure 5:
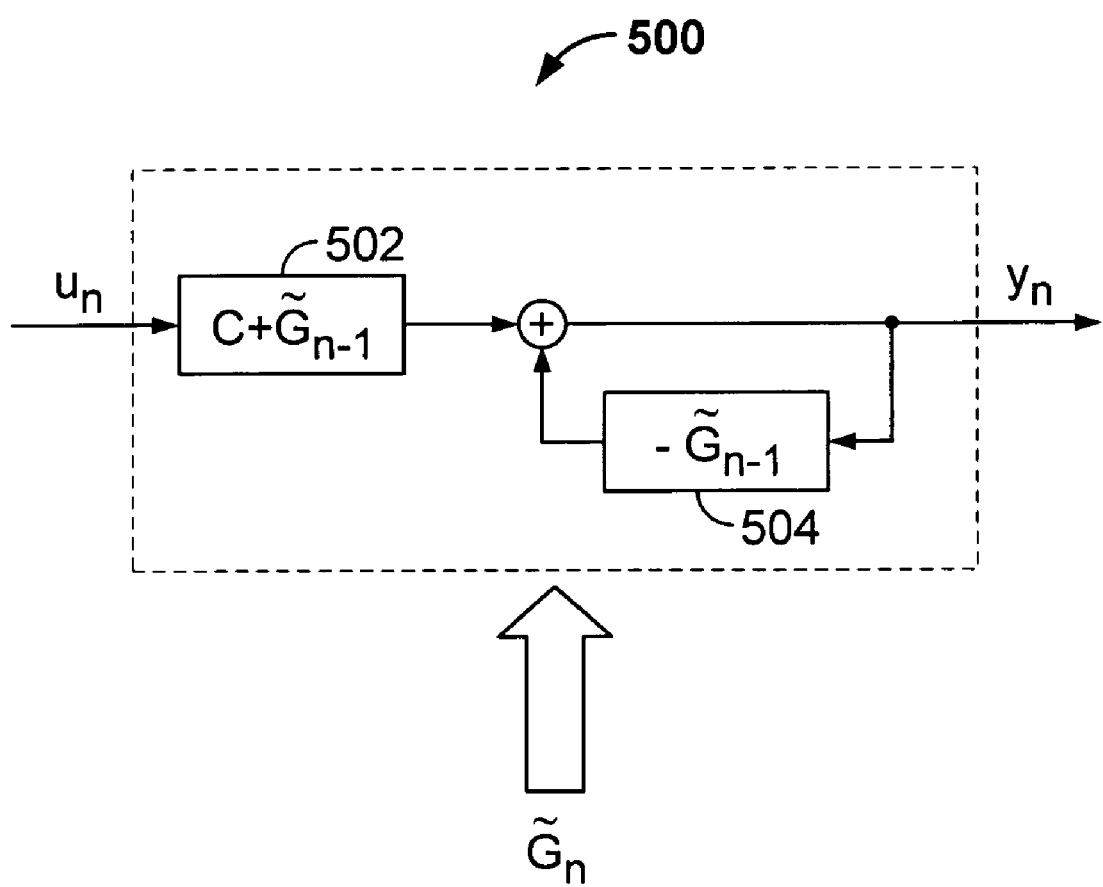
FIG. 5 is a block diagram illustrating another filter embodiment configured to observe the system output.

FIG. 5 is a block diagram illustrating another filter embodiment configured to observe the system output. Filter 500 shown in this example implements equation 24 and equivalently implements equation 28. At time n, $\tilde{G}_n$, the time varying mode vector is computed and sent to the filter. The mode vector is used to configure filters 502 and 504, which have transfer functions dependent on the mode vector. In this example, the mode vector is delayed to provide $\tilde{G}_{n-1}$. Filters 502 and 504 have transfer functions of $C+\tilde{G}_{n-1}$ and $-\tilde{G}_{n-1}$, respectively. Input variable $u_n$ is sent to filter 502, and output $y_n$ is fed back to filter 504. The outputs of the two filters are added to generate output $y_n$.

Figure 6A:
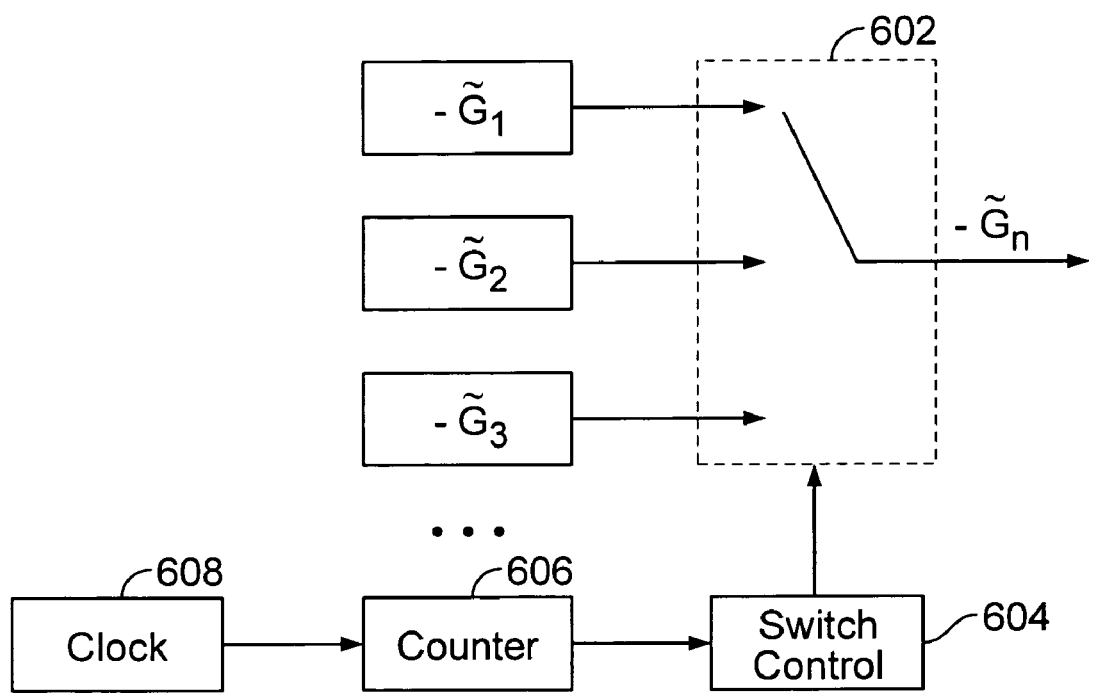
FIGS. 6A-6C are block diagrams illustrating several circuit embodiments configured to provide the appropriate mode vector over time.
Figure 6B:
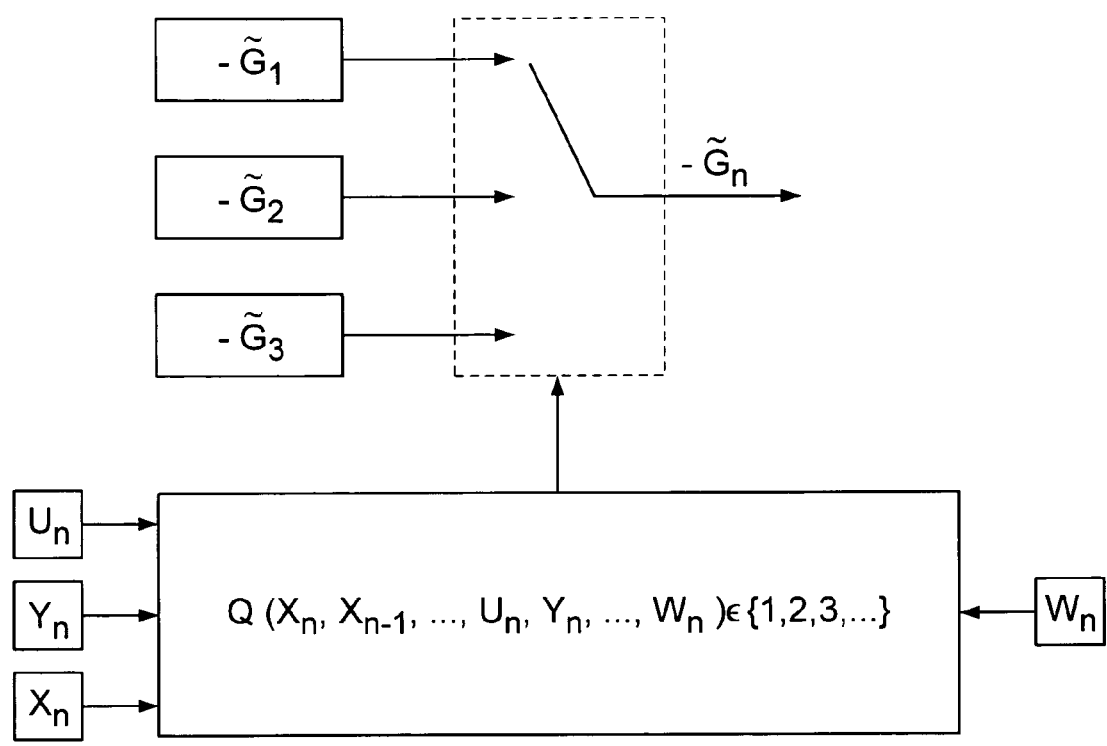
Figure 6C:
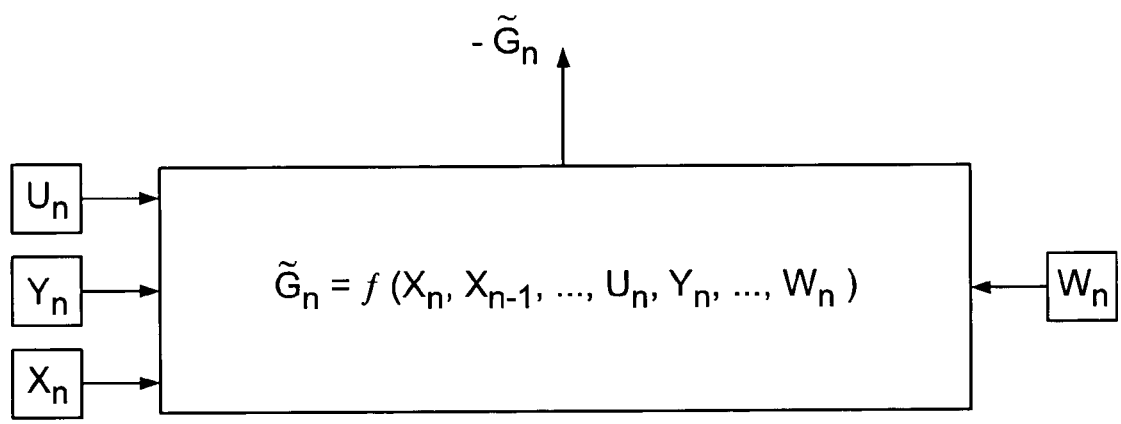

There are different ways to provide the appropriate mode vector over time. FIGS. 6A-6C are block diagrams illustrating several circuit embodiments configured to provide the appropriate mode vector over time. In the example shown in FIG. 6A, the mode vector is a pseudo periodic function of time. Its values are pre-determined, negated and stored. Clock 608 drives counter 606, which in turn drives switch control 604. At a specified level, the output of the counter triggers switch control 604 to change the position of switch 602. For example, in some embodiments, switch 602 is initially set to the first position and $-\tilde{G}_1$ is selected. Next time when the counter triggers another change, the switch control sets the switch to the next position and selects the next mode vector $-\tilde{G}_2$ and so on. Once each of the pre-determined mode vectors has been selected, counter 606 resets, switch control 604 returns the first position and the cycle repeats. In one embodiment, the circuit is used in a power management chip. Various implementations of the switch are used in different embodiments. In some embodiments, for example, the switch is implemented as a computation engine that includes a pointer. When a decision criteria is met and the next mode vector is to be selected, the pointer points to the registry address where the next mode vector is stored.

FIG. 6B is a block diagram illustrating another circuit embodiment configured to determine the mode vector at different times. In this example, the selection of the mode vector depends on function Q, which is a function of variables such as inputs, outputs and states. The arrangement of the variables and the actual function depends on the characteristics of the system. Function Q produces a switch control output, which is mapped to one of the pre-computed vectors. In some embodiments, the switch control output is approximated to its nearest integer value and used as the index of the mode vector selected. For example, an output of 3.6 corresponds to $-\tilde{G}_4$. In some embodiments, a modulus operation may be performed to derive the appropriate index value. Other mapping algorithms are used in different embodiments as appropriate.

FIG. 6C is a block diagram illustrating yet another circuit embodiment configured to determine the mode vector at different times. In this example, the appropriate $-\tilde{G}_n$ is determined analytically by computing a function $f$, which depends on variables such as inputs, outputs, states, external signals, etc. In one example, $\tilde{G}_n = [\tilde{g}_{1,n} \tilde{g}_{2,n} \ldots \tilde{g}_{N-1,n}] = [x_n^0 x_{n-1}^1, u_n^2, \ldots y_{n-2}^3]$ and the function used to compute $\tilde{G}_n$ includes a different subfunction for each of the terms in the mode vector.

The examples shown in FIGS. 6A-6C assume that the mode vector (or a function of the mode vector) of the system is known a priori. In some embodiments, the mode vector provided is different from the actual mode vector of the system. States that correspond to the adjusted mode vector, rather than states that correspond to the actual mode vector of the system, are generated. In other words, by making appropriate changes to the mode vector of a system, the states of the system can be controlled. For example, the rate at which a system (such as the ones shown in FIGS. 6A and 6B) switches the values of the mode vector will alter the state variables that are generated based on the mode vector. In some embodiments, the states of the system are controlled by changing the inputs.

The time varying composite mode vector $\tilde{G}_n$ is sometimes decomposed into several components (also referred to as constituent modes) that correspond to various system states. By comparing the constituent modes with measurements (using, for example, the least mean square algorithm), it is possible to determine the correspondence between the mode vector and configurable states or inputs, and hence how much influence a particular system state has on the overall system.

For example, a mode vector for a system may be decomposed to a first constituent mode that corresponds to the system's bias voltage and a second constituent mode that corresponds to the temperature. Measurements of the system's outputs that correspond to various bias voltage and temperature values may indicate that the system is more sensitive to changes in bias voltage than changes in temperature. This information is relevant for controlling the system.

In some embodiments, the inverse of a system's state space filter is determined. For example, in some communication systems, the received signal is used to estimate the state variables associated with the channel. Based on the state variables, the inverse state space filter is determined to correct for the nonlinearities of the channel and recover the transmitted signal. The inverse state space filter can be determined as follows:

$$X_{n+1} = \begin{bmatrix} x_n^0 & x_{n-1}^0 & \cdots & x_{n-N+1}^0 \\ x_n^1 & x_{n-1}^1 & \cdots & x_{n-N+1}^1 \\ \vdots & \vdots & \cdots & \vdots \\ x_n^{N-1} & x_{n-1}^{N-1} & \cdots & x_{n-N+1}^{N-1} \end{bmatrix} \left(-\tilde{G}_n^T - C^T\right) + \begin{bmatrix} u_n \\ u_{n-1} \\ \vdots \\ u_{n-N+1} \end{bmatrix}$$

(Equation 29)

$$= [X_n \cdots X_{n-N+1}]\left(-\tilde{G}_n^T - C^T\right) + U_n$$

$$= \overline{X}_n\left(-\tilde{G}_n^T - C^T\right) + U_n.$$

The output of the state space equation is expressed as $$y_n = -CX_n + Du_n \quad \text{(Equation 30)}.$$

For purposes of example, let D=1. The resulting IIR equation is $$y_n = u_n + \tilde{G}_{n-1}\hat{U}_{n-1} - (\tilde{G}_{n-1}+C)\hat{Y}_{n-1} = u_n + \tilde{H}_{n-1}\hat{U}_{n-1} - (\tilde{H}_{n-1})\hat{Y}_{n-1}$$

(Equation 31)

Figure 7A:
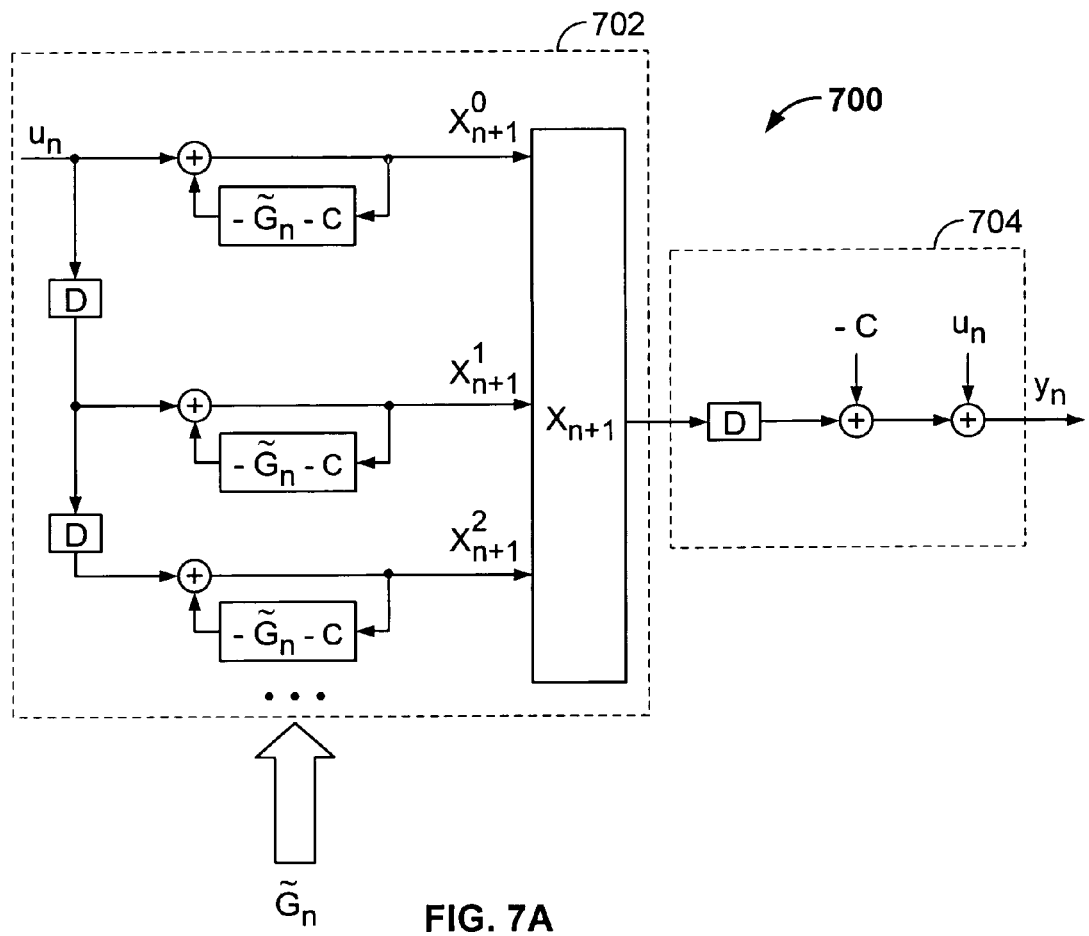
FIG. 7A is a block diagram illustrating an inverse state space filter embodiment.

FIG. 7A is a block diagram illustrating an inverse state space filter embodiment. In this example, inverse system 700 is configured to estimate the inverse state variables of an original system (e.g. filter 400 of FIG. 4) and determine the input to the original system. In an inverse system such as this, input u corresponds to the output of the original system, output y corresponds to the estimated input of the original system, and state variable x corresponds to the inverse of the state variable of the original system. Filter 700 includes a state observation module 702 and an output computation module 704. State observation module 702 implements equation 29, where the states of the inverse state space filter at time n+1 is determined based on the history of input and the history of the states. The mode vector $\tilde{G}_n$ is sent to the system to configure a filter bank, formed by filters such as 706. The transfer function of each filter in the filter bank is set to $-\tilde{G}_n-C$. Each filter processes a corresponding state variable at time n, and each filter output is summed with a delayed input to generate the state variable at time n+1.

At time n, state observation module 702 sends $X_{n+1}$ (the state vector of the inverse system at time n+1) to output computation module 704. $X_{n+1}$ is delayed to generate state vector $X_n$ at time n, which is multiplied with coefficient $-C$ and summed with the input $u_n$ to generate output $y_n$. Thus, computation module 704 implements equation 30, and equivalently equation 31.

Figure 7B:
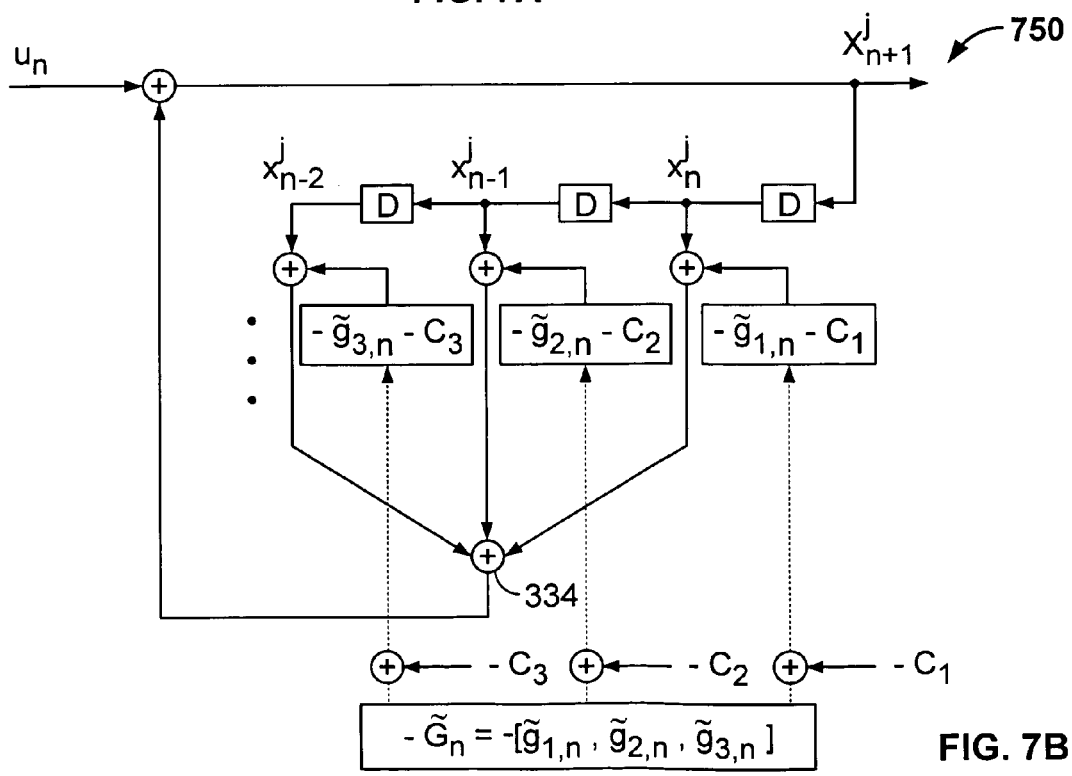
FIG. 7B is a block diagram illustrating the details of a state transition unit used to generate a state variable, according to some embodiments.

FIG. 7B is a block diagram illustrating the details of a state transition unit used to generate a state variable, according to some embodiments. In this example, the state variable to be computed is $x_{n+1}^j$, a j-th inverse state variable at time n+1. The state variable is sent to a plurality of delay stages to be multiplied with a plurality of filter coefficients. In the example shown, each of the filter coefficient is a function of a mode $\tilde{g}_{j,n}$ and a coefficient c. The multiplication results are summed and added to a delayed input to generate the desired state variable.

Figure 7C:
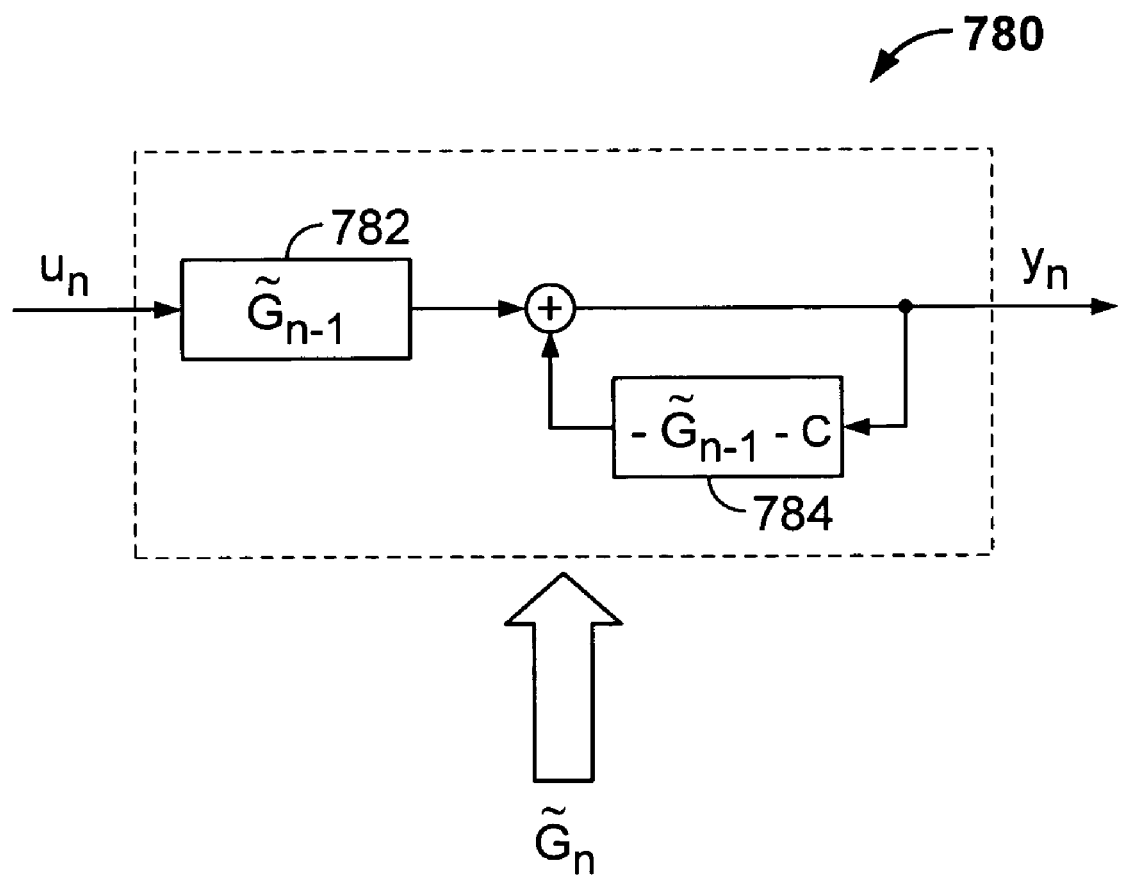
FIG. 7C is a block diagram illustrating another inverse filter embodiment.

FIG. 7C is a block diagram illustrating another inverse filter embodiment. In this example, filter 780 is configured to observe an output based on the input without generating the state variables in between. Filter 780 implements equation 31 by including filters 782 and 784, which have transfer functions of $\tilde{G}_{n-1}$ and $-C-\tilde{G}_{n-1}$, respectively. At any given time n, the appropriate mode vector $\tilde{G}_n$ is sent to the system to configure the filters. Input variable $u_n$ is sent to filter 782, and output $y_n$ is fed back to filter 784. The outputs of the two filters are added to generate output $y_n$.

Figure 8:
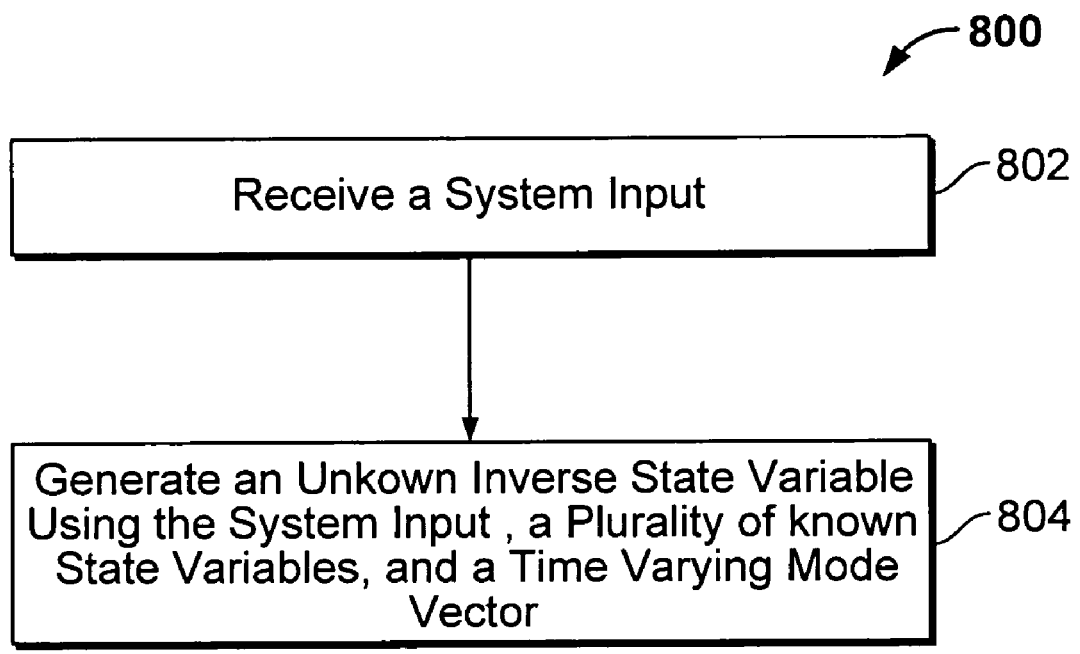
FIG. 8 is a block diagram illustrating an inverse filter embodiment.

FIG. 8 is a flowchart illustrating an estimation process of an inverse filter embodiment. Process 800 may be performed by, for example, inverse filter systems 700 and 780. In the example shown, the process initiates when a plurality of known state variables that correspond to the inverse states of the original system is received (802). The known state variables, plus a time varying mode vector and an inverse system input are used to generate the inverse state variables of the inverse filter system (804).

Figure 9A:
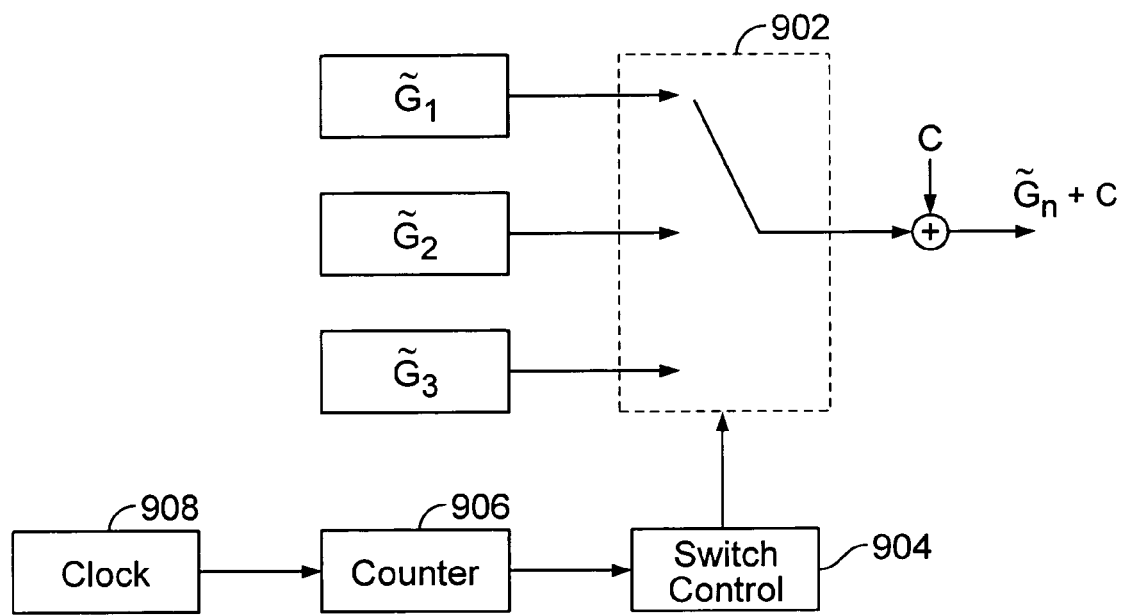
FIGS. 9A-9C are block diagrams illustrating several circuit embodiments configured to provide the mode vector.
Figure 9B:
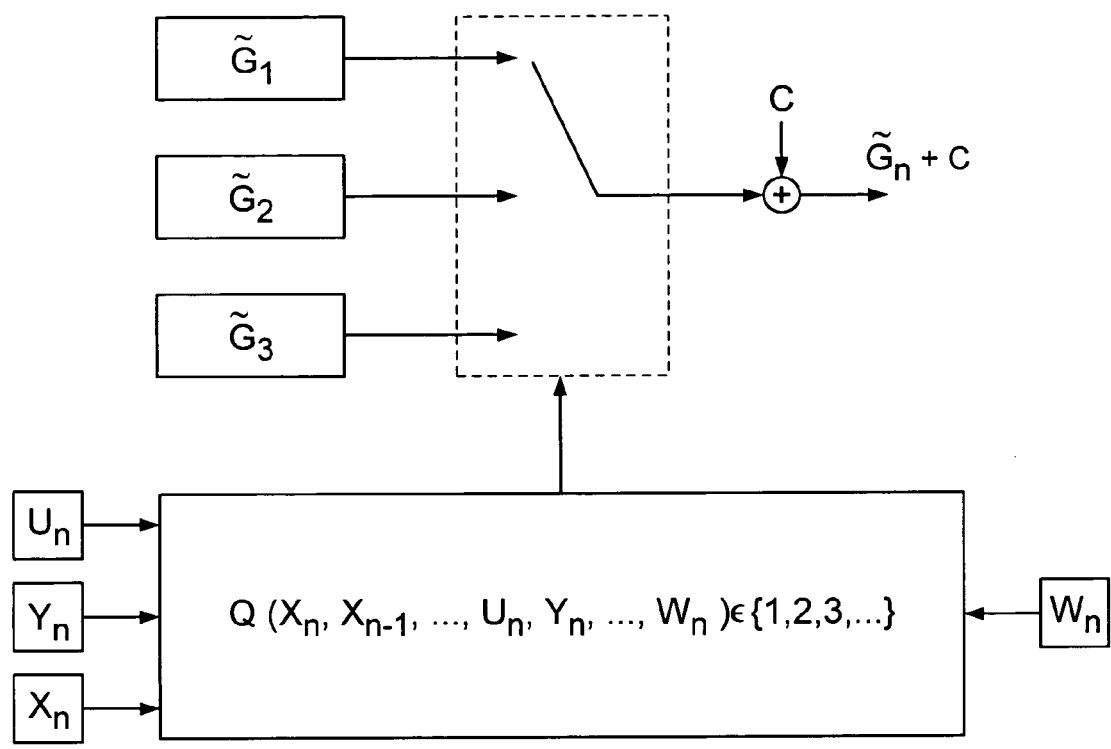
Figure 9C:
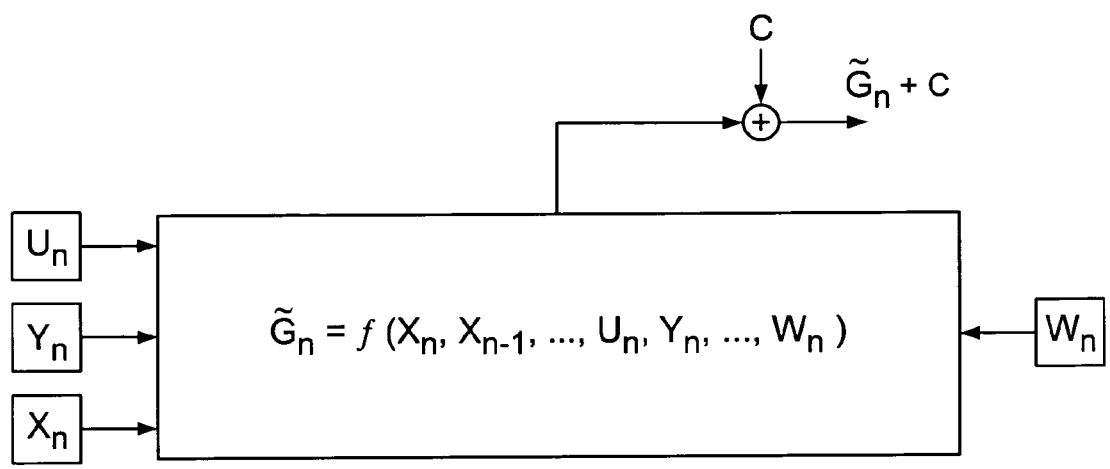

FIGS. 9A-9C are block diagrams illustrating several circuit embodiments configured to provide the mode vector. In FIG. 9A, the mode vectors are pre-computed and stored. In some embodiments, the vectors are optionally negated. Switch 902 is driven by switch control 904 to select $\tilde{G}_n$ at time n from the stored mode vectors. $\tilde{G}_n$ is combined with C to generate $C+\tilde{G}_n$ used to configure filter 804, and sent directly to filter 802.

In FIG. 9B, the mode vectors are also pre-computed, negated and stored. The selection of the mode vector depends on function Q, which is a function of variables such as inputs, outputs and states. Function Q produces a switch control output, which is mapped to one of the pre-computed vectors. In FIG. 9C, function $f$ is used to analytically compute $\tilde{G}_n$, which may depend on variables such as inputs, outputs, states, external signals, etc.

Observing unknown system states based on time varying mode vectors, system inputs, and known state variables has been disclosed. The techniques disclosed are applicable to both nonlinear and linear systems.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An observation system configured to observe one or more initially unknown state variables of an observed system, comprising:
   an input interface configured to receive a system input; and
   a processing module coupled to the input interface; wherein
   the processing module is configured to determine the one or more initially unknown state variables; and
   the processing module is configured to perform the determination based at least in part on the system input, a plurality of known state variables, and a time varying mode vector $\tilde{G}_n$ that is time dependent, wherein n is a time step and a value of n corresponds to a sequence of integers.

2. The system of claim 1, wherein the processing module includes a plurality of filters.

3. The system of claim 2, wherein at least some of the plurality of filters have filter characteristics that are time dependent.

4. The system of claim 2, wherein at least some of the plurality of filters include filter coefficients that are configured based at least in part on the time varying mode vector.

5. The system of claim 2, wherein each of the plurality of filters is configured to determine a corresponding one of the initially unknown state variables.

6. The system of claim 1, wherein the time varying mode vector includes a plurality of modes, and at least some of the plurality of modes are time dependent.

7. The system of claim 1, wherein the processing module is further configured to estimate an output of the observed system.

8. The system of claim 7, wherein the output of the observed system is estimated based at least in part on the one or more initially unknown state variables that are determined.

9. The system of claim 1, wherein the observation system is included in a power management device.

10. The system of claim 1, wherein the observed system is controlled based at least in part on a comparison of a constituent mode of the time varying mode vector and a measurement.

11. The system of claim 1, wherein the observed system is a nonlinear system.

12. The system of claim 1, wherein the time varying mode vector changes as past values of its variables change.

13. A method of observing one or more initially unknown state variables of an observed system, comprising:
   receiving a system input; and
   determining the one or more initially unknown state variables based at least in part on the system input, a plurality of known state variables, and a time varying mode vector $\tilde{G}_n$ that is time dependent, wherein n is a time step and a value of n corresponds to a sequence of integers.

14. The method of claim 13, wherein determining the one or more initially unknown state variables include configuring a plurality of filters.

15. The method of claim 14, wherein at least some of the plurality of filters include filter coefficients that are configured based at least in part on the time varying mode vector.

16. The method of claim 14, wherein each of the plurality of filters is configured to determine a corresponding one of the initially unknown state variables.

17. The method of claim 13, wherein the time varying mode vector includes a plurality of modes, and at least some of the plurality of modes are time dependent.

18. The method of claim 13, wherein the method further comprising estimating an output of the observed system.

19. The method of claim 18, wherein the output of the observed system is estimated based at least in part on the one or more initially unknown state variables that are determined.

20. The method of claim 13, wherein the time varying mode vector changes as past values of its variables change.

21. A system configured to observe one or more initially unknown inverse state variables of an original system, comprising:
   an input interface configured to receive a system input; and
   a processing module coupled to the input interface; wherein
      the processing module is configured to determine the one or more initially unknown inverse state variables; and
   the processing module is configured to perform the determination based at least in part on the system input, a plurality of known state variables associated with the original system, and a time varying mode vector $\tilde{G}_n$ that is associated with the original system and that is time dependent, wherein n is a time step and a value of n corresponds to a sequence of integers.

22. The system of claim 21, wherein the system input corresponds to an output of the original system, and the processing module is further configured to estimate an input of the original system based at least in part on the unknown inverse state variables.

23. The system of claim 21, wherein the processing module includes a plurality of filters, and at least some of the plurality of filters include filter coefficients that are configured based at least in part on the time varying mode vector.

24. The system of claim 21, wherein the time varying mode vector changes as past values of its variables change.

25. A method for observing one or more initially unknown inverse state Variables of an original system, comprising:
   receiving a system input; and
   determining the one or more initially unknown inverse state variables; wherein
      the determination being based at least in part on the system input, a plurality of known state variables associated with the original system, and a time varying mode vector $\tilde{G}_n$ that is associated with the original system and that is time dependent, wherein n is a time step and a value of n corresponds to a sequence of integers.

26. The method of claim 25, wherein the system input corresponds to an output of the original system, and the method further comprising estimating an input of the original system based at least in part on the initially unknown inverse state variables that are determined.

27. The method of claim 25, further comprising configuring a plurality of filter coefficients based at least in part on the time varying mode vector.

28. The method of claim 25, wherein the time varying mode vector changes as past values of its variables change.

* * * * *

UNITED STATES PATENT AND TRADEMARK OFFICE
CERTIFICATE OF CORRECTION

PATENT NO. : 7,689,297 B2 Page 1 of 1
APPLICATION NO. : 12/288783
DATED : March 30, 2010
INVENTOR(S) : Roy G. Batruni It is certified that error appears in the above-identified patent and that said Letters Patent is hereby corrected as shown below:

Claim 25
Column 12, line 31 delete "state Variables of" and insert -- state variables of --

Signed and Sealed this

Twenty-fifth Day of May, 2010

David J. Kappos
*Director of the United States Patent and Trademark Office*